Patented May 12, 1942

2,282,361

UNITED STATES PATENT OFFICE 2,282,361

INSULATING AND REFRACTORY PLASTIC

Douglas A. Howell, Peter S. Gilchrist, William W. Ingle, and Leo H. Crosson, Charlotte, N. C., assignors to Charlotte Chemical Laboratories, Inc., Charlotte, N. C., a corporation of North Carolina No Drawing. Application July 1, 1939,
Serial No. 282,440

4 Claims. (Cl. 106—58)

The present invention relates to a method of manufacturing an improved insulating and refractory plastic for furnace lining, etc., that is economical, will not crack, expand or contract, and therefore does not require expansion joints, a plastic which will retain the same form or chemical formulae upon standing or heating (the basic mineral or minerals being a stable mined mineral), a plastic that is equal to or better in chemical and physical properties to most other plastics, a plastic that has a low heat conductivity and a low co-efficient of expansion, that is not affected by acids except hydrofluoric acid or alkalies, that is lighter in weight than the average commercial plastic yet has a coverage equal to or greater than the plastics now used, a plastic to which slag does not adhere to as readily as the now known plastics, and a plastic that can be built monolithicly. Such a plastic can be used in connection with the fire boxes of boilers, high temperature insulating, and furnaces of various kinds operating under temperatures, either varying or constant, approaching 3000° Fahrenheit.

Numerous attempts have been made to obtain the above named qualities, but they have failed as the plastic used commercially contracts and expands so that expansion joints have to be used. The heretofore used plastic cracks in many instances, and therefore, cannot be built monolithicly. Our present invention overcomes these difficulties and also equals or surpasses many other commercial plastics in chemical and physical properties.

Aside from the occasional occurrence of certain silicates in specimens suitable for gems, only a few of the silicas and the rock forming silicates have been of economic importance. In accordance with the practice of our present invention certain minerals from such groups as the silicas, feldspars, the feldspathoids, the pyroxenes, the amphiboles, the olivines, the andalusites, the scapolites, the epidotes, the zeolites, the micas, the chlorites, the silicates of magnesium and the silicates of aluminum, and certain other metal silicates have been found to have definite furnace plastic properties when compounded (either alone or mixed) in proper proportions with an acid orthosilicate or a suitable binder, silicate of soda and water. Thus, by the correct mixing of a rock forming silicate or certain metal silicates or rock forming silicates with an acid orthosilicate or a suitable binder, namely, kaolin (or any acid orthosilicate that does not lower the fusion point) sodium silicate and water, a commercial plastic can be obtained that will stand up to approximately 3000° Fahrenheit. This temperature takes care of approximately 95% of all commercial installations. This invention not only produces a plastic that is (1) economical, (2) but a plastic that will not crack, (3) a plastic that will not expand, (4) a plastic that will not contract, (5) a plastic that does not require expansion joints, (6) a plastic that does not change form upon heating, and (7) a plastic that is not affected by acids, with the exception of hydrofluoric acid, (8) a plastic that is not affected by alkalies, (9) a plastic that retains the same chemical formulae upon standing, (10) a plastic that is equal to or better than other plastics in physical properties, (11) a plastic that is equal to or better than other plastics in chemical properties, (12) a plastic that has the same chemical formulae at all temperatures, (13) a plastic that is lighter in weight than other plastics yet, (14) a plastic giving the same or better coverage, than other commercial plastics, (15) a plastic to which slag does not adhere to as readily as other plastics, (16) a plastic that has a low heat conductivity, (17) a plastic that can be built monolithicly and (18) a plastic that has a very low co-efficient of expansion. This improved plastic is very pliable and therefore can be molded easily. It is not necessary to use high pressure to press it into place. Application in a furnace is made by a flat face hammer to pound the plastic into place. In all types of tests run in several laboratories, and in the use of many tons in commercial installations under varying conditions verify the fact that the plastic equals and surpasses many other plastics and possesses the above named advantages.

We have found it expedient to analyze the mineral or minerals used as a base and to adjust the acid orthosilicate, silicate of soda, and water accordingly. The water used is to make the mixture pliable, always using just enough to moisten the mixture, avoiding an excess. For example, in a plastic using as a base a rock forming hydrous aluminum silicate whose analysis is:

| | Per cent |
|---|---|
| Silica | 68.77 |
| Alumina | 26.73 |
| Water | 4.50 | and employing an acid orthosilicate whose analysis is:

| | Per cent |
|---|---|
| Silica | 46.8 |
| Alumina | 36.7 |
| Ferric oxide | 1.2 |
| Soda | 1.8 |
| Loss of ignition | 13.6 | together with silicate of soda whose analysis is:

| | Per cent |
|---|---|
| Sodium oxide | 13.8 |
| Silicon oxide | 33.7 |
| Water | 52.5 | the water can vary from 8 to 12 parts per 100 of plastic, while we have found that 11.8 parts (11.8%) per 100 of plastic in the above case gives the best results.

Likewise an analysis of the rock forming hydrous aluminum silicate controls the percentage of the acid orthosilicate or binders used. For example, a plastic made from a rock forming hydrous aluminum silicate from North Carolina having a chemical formulae of:

| | Per cent |
|---|---|
| Silicon oxide | 71.40 |
| Aluminum oxide | 22.87 |
| Ferric oxide | 0.13 |
| Calcium oxide | 0.23 |
| Magnesium oxide | Trace |
| Manganese oxide | .002 |
| Titanium oxide | 0.09 |
| Total alkali | 0.90 |
| Ignition loss | 4.2 |
| Moisture | 0.18 | was found to be best with 11.0% of an acid orthosilicate having the analysis of:

| | Per cent |
|---|---|
| Silicon oxide | 47.26 |
| Aluminum oxide | 37.83 |
| Titanium oxide | 1.2 |
| Ferric oxide | 0.7 |
| Calcium oxide | Trace |
| Magnesium oxide | 0.20 |
| Potassium oxide | 0.10 |
| Sodium oxide | 0.20 |
| Ignition loss | 12.50 | while a Georgia rock forming hydrous aluminum silicate having a chemical formulae of:

| | Per cent |
|---|---|
| Silicate | 68.77 |
| Alumina | 26.73 |
| Ignition loss | 4.50 | required only 9% of the same acid orthosilicate. The acid orthosilicate—or any suitable binder—can be varied from the general formulae above without sacrificing the properties desired, as long as the binder shrinkage is approximately equal to the expansion of the rock forming silicates. Our invention is a mechanical mixture in which advantage is taken of these expansion and contraction properties to give a resultant which has a minimum of either shrinkage or expansion. The binders used are ones with a high alumina content and having a density of 2.5 to 2.7. When heated to 932° Fahrenheit a number of the binders are decomposed into alumina, water and silica and upon continuing the heat up from 2192° to 2372° Fahrenheit the silica and alumina recombine, thus making a high quality aluminum silicate.

Rock forming hydrous silicates, such as the ones previously named cannot be used alone as a plastic because when heated they expand and swell. The coarse particles of the rock forming hydrous aluminum silicate expand greatly on heating or calcining while the finer pieces expand appreciably less. The coarse particles are obtained from the grinding of a massive or rock forming hydrous aluminum silicate so their particle size can be closely controlled. These rock forming hydrous silicates have a thermal expansion varying with their degree of fineness and it is this property which is utilized in combination with proper binders to enable the plastic not to shrink or expand after being subjected to furnace temperatures. The binder is subjected to the same temperature as the rock forming silicate and its contraction must be approximately equal to the small expansion of the fine rock forming silicates. We have found that in utilizing the above principle, the rock forming silicates usually compose around 75% of the plastic while this varies depending upon the composition of the basic mineral. A typical analysis of the basic mineral which composes about 75% of the plastic is as follows:

| | Per cent |
|---|---|
| Silicon oxide | 71.40 |
| Aluminum oxide | 22.87 |
| Ferric oxide | 0.13 |
| Calcium oxide | 0.23 |
| Magnesium oxide | Trace |
| Manganese oxide | 0.002 |
| Titanium oxide | 0.09 |
| Total alkali | 0.90 |
| Ignition loss | 4.20 |
| Moisture | 0.18 |

We have found it expedient in obtaining maximum results to have the basic mineral vary in size so that there is a locking and interlocking of the particles to produce a more desirable and stable plastic. Using the above rock forming hydrous aluminum silicate whose analysis is given as a typical example, the screen tests are as follows:

| | Per cent |
|---|---|
| Retained on a #4 (U. S. Standard Screen) | 1.86 |
| Retained on a #6 (U. S. Standard Screen) | 9.07 |
| Retained on a #8 (U. S. Standard Screen) | 6.21 |
| Retained on a #10 (U. S. Standard Screen) | 4.56 |
| Retained on a #20 (U. S. Standard Screen) | 12.93 |
| Retained on a #60 (U. S. Standard Screen) | 49.48 |
| Retained on a #100 (U. S. Standard Screen) | 7.39 |
| Retained on a #200 (U. S. Standard Screen) | 5.93 |
| Thru 200 mesh | 2.57 |

It is not necessary to have the above percentages for plastics that are not subjected to high heats, namely the #20 Mesh Screen percentage can be increased to about 42% and the #10 can be increased to about 11% if the temperature is below 2100° Fahrenheit, but by controlling the size as illustrated in the table above in addition with the mechanical mixing of proper binders so that there is a minimum of both shrinkage and expansion a plastic that will not crack, expand, or contract is obtained.

The percentage of silicate of soda used is generally low but the amount varies upon the composition of the basic mineral and the type of silicate of soda used. As an example using the rock forming silicate whose analysis is given immediately above as a typical example, the silicate of soda used is about 2.2% and has an analysis of:

| | Per cent |
|---|---|
| Sodium oxide | 13.8 |
| Silicon oxide | 33.7 |
| Water | 52.5 |

A plastic made as outlined above namely:

| | Per cent |
|---|---|
| Basic mineral | 75 |
| Acid orthosilicate | 11 |
| Silicate of soda | 2.2 |
| Water | 11.8 | makes an excellent insulating material as shown by tests in the laboratory and plants. A plastic wall 5⅜ inches thick with a temperature on the furnace side of 2400° Fahrenheit shows 497° Fahrenheit on the outside, a difference of 1903° Fahrenheit. Insulating properties are further illustrated by plant data. A furnace wall of a boiler was 1700° Fahrenheit on the furnace side and the plastic 5⅜ inches thick. The outer wall temperature was 180° Fahrenheit—a drop of 1520° Fahrenheit. These two tests show that our plastic has insulating qualities which are far above the qualities of the average commercial insulating plastic now on the market. For comparison a commercial insulating wall composed of 9 inches of fire brick, 2½ inches insulating material and 3¾ inches common red brick, totalling 15¼ inches thick (a typical wall) had a temperature of 1510° Fahrenheit on the furnace side and 164° Fahrenheit on the outside, a drop of 1346° Fahrenheit. The comparison proves our 5⅝ inch plastic wall is better than the 15¼ inch wall of fire brick, red brick and insulation.

That the plastic is stable in composition and remains a desirable plastic at all temperatures is revealed by an analysis of the plastic after it has been subjected to a temperature of 3000° Fahrenheit for several hours. The analysis is as follows:

| | Per cent |
|---|---|
| Silicon oxide | 72.083 |
| Aluminum oxide | 25.852 |
| Titanium oxide | 0.245 |
| Ferric oxide | 0.212 |
| Total alkali | 1.224 |
| Calcium oxide | 0.208 |
| Magnesium oxide | 0.027 |
| Manganese oxide | 0.0012 |

It has been shown that in the use of the hydrous aluminum silicate having a high percentage of alumina that a lower percentage of the acid orthosilicate is required. It also is evident that as the silica content of the hydrous aluminum silicate increases, the amount of silicate of soda required to counteract the expansion of the hydrous aluminum silicate decreases.

In the specification there has been set forth a preferred embodiment of the invention, and although specific terms are employed they are used in a generic and descriptive sense only and not for purposes of limitation, the scope of the invention being set forth in the appended claims:

We claim:

1. A composition adapted upon the addition of water and application of heat to produce a refractory plastic that has substantially negligible expansion and contraction characteristics, can be built up monolithically without expansion joints, and has exceptional heat insulating properties, comprising a preponderant proportion of a rock forming hydrous metal silicate selected from the group consisting of silicas, feldspars, the feldspathoids, the pyroxenes, the amphiboles, the olivines, the andalusites, the scapolites, the epidots, the zeolites, the micas, the chlorites, the silicates of magnesium and the silicates of aluminum, an acid orthosilicate that contains about 45.6% to 57.93% silica and 26.4% to 38.7% alumina, and a temporary liquid binder that holds the composition in an integrated cohesive mass until it is made permanently cohesive by heating as aforesaid, said hydrous metal silicate being of relatively coarse granular formation and of such particle size that approximately 12% to 42% may be retained on a No. 20 U. S. standard screen and approximately 4% to 11% may be retained on a No. 10 U. S. standard screen, and said acid orthosilicate being characterized by fine substantially colloidal size particles, said composition when heated to form a plastic and applied as a monolithic layer having superior insulating properties to conventional fire brick walls of substantially greater thickness.

2. A composition adapted upon the addition of water and application of heat to produce a refractory plastic that has substantially negligible expansion and contraction characteristics, can be built up monolithically without expansion joints, and has exceptional heat insulating properties, comprising a preponderant proportion of a rock forming hydrous metal silicate selected from the group consisting of silicas, feldspars, the feldspathoids, the pyroxenes, the amphiboles, the olivines, the andalusites, the scapolites, the epidots, the zeolites, the micas, the chlorites, the silicates of magnesium and the silicates of aluminum, an acid orthosilicate that contains about 45.6% to 57.93% silica and 26.4% to 38.7% alumina, and a temporary liquid binder that holds the composition in an integrated cohesive mass until it is made permanently cohesive by heating as aforesaid, said hydrous metal silicate being of relatively coarse granular formation and of varying particle size such that when screened the following approximate amounts will be retained on the several U. S. standard screens:

| | Per cent |
|---|---|
| Retained on a #4 (U. S. Standard Screen) | 1.86 |
| Retained on a #6 (U. S. Standard Screen) | 9.07 |
| Retained on a #8 (U. S. Standard Screen) | 6.21 |
| Retained on a #10 (U. S. Standard Screen) | 4.56 |
| Retained on a #20 (U. S. Standard Screen) | 12.93 |
| Retained on a #60 (U. S. Standard Screen) | 49.48 |
| Retained on a #100 (U. S. Standard Screen) | 7.39 |
| Retained on a #200 (U. S. Standard Screen) | 5.93 |
| Thru 200 mesh | 2.57 |

3. A heat insulating refractory composition adapted upon the application of heat to form a mass which has substantially negligible expansion and contraction characteristics, comprising a preponderant proportion of a rock-forming hydrous metal silicate selected from the group consisting of the silicates of magnesium and aluminum, and a substantially smaller amount of an acid orthosilicate which contains approximately 45.6% to 57.93% silica and 26.4% to 38.7% alumina, and just sufficient amount of moisture to maintain the composition in a thick cohesive mass, said hydrous metal silicate being of relatively coarse granular formation and varying in particle size so that there is a locking and an interlocking of the particles, the varying particle size being characterized by the fact that approximately 50% of the particles will be retained on a #60 U. S. Standard Screen and approximately 12% will be retained on a #20 U. S. Standard Screen, the amount of water and varying particle size of said metal silicate being so controlled that substantially no dimensional changes will take place in the composition upon application of heat.

4. A refractory heat insulating composition in the nature of a heavy thick cohesive mass and containing a preponderant proportion of a granular hydrous rock-forming aluminum silicate, a substantially smaller portion of an acid orthosilicate which is characterized by colloidal size particles, a liquid adhesive binder, and just sufficient water to moisten the composition and render it workable and applicable as a thick cohesive mass, the varying particle size of said granular aluminum silicate being such that approximately 12% to 42% may be retained on a #20 U. S. Standard Screen and approximately 4% to 11% may be retained on a #10 U. S. Standard Screen, the amount of water and varying particle size of the aluminum silicate being so controlled in the composition that substantially no dimensional changes will take place therein upon application of heat.

DOUGLAS A. HOWELL.
PETER S. GILCHRIST.
WILLIAM W. INGLE.
LEO H. CROSSON.